United States Patent Office 3,306,936
Patented Feb. 28, 1967

3,306,936
NOVEL HALOGENATED SULFIDES
Louis G. Anello, Basking Ridge, and Richard F. Sweeney, Dover, N.J., assignors to Allied Chemical Corporation, New York, N.Y., a corporation of New York
No Drawing. Filed Mar. 2, 1965, Ser. No. 436,684
19 Claims. (Cl. 260—586)

This invention relates to the production of a novel class of unsaturated, alicyclic, halogen-containing ketone sulfides.

An object of this invention is to provide a novel class of chemical compounds and more particularly to provide a class of bis(perhalocyclopentenone and cyclohexenone) sulfides, hereinafter referred to as sulfides, which sulfides are characterized by the presence of a chlorine or fluorine atom on one of the unsaturated carbon atoms of each of the cycloalkenone groups, all of the unsatisfied valences of the saturated cyclic carbon atoms being perhalogenated with either fluorine or chlorine atoms, there being present at least two fluorine atoms and two chlorine atoms in the molecule.

Another object of the invention is to provide a process for the production of the above-described sulfides.

Other objects and advantages of the invention will become apparent from a consideration of the following description and discussion of the subject invention.

The novel sulfides of the invention may be represented by the following formula:

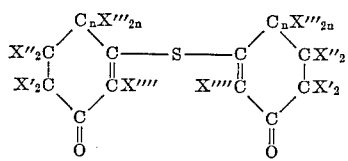

wherein X'–X'''' may be F or Cl and $n$ may be 0 or 1, there being at least two fluorine atoms and two chlorine atoms present in the molecule.

It has been found that the above-described sulfides are useful as solvents for polymers, terpolymers and copolymers of trifluorochloroethylene and as sealing adjuvants for films of such polymers.

The novel sulfides may be prepared by reacting a perhalocycloalkenone of the formula:

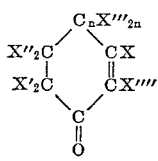

wherein X–X'''' may be F or Cl and may be the same or different provided that there is present at least one fluorine atom and one chlorine atom within X'–X'''' and $n$ may be 0 or 1, with an alkali metal hydrosulfide or a hydrate thereof.

The reaction may be carried out with or without a solvent. If a solvent is employed, any of the well known inert polar solvents may be used, dioxane, diglyme and dimethylformamide, being exemplary.

The alkali metal hydrosulfide employed may be used in commercial grade, which is normally the hydrated form. For example, NaSH is sold commercially as NaSH·XH₂O. If desired, the alkali metal hydrosulfide may be purified and used in anhydrous form. Of the alkali metal hydrosulfides, NaSH and KSH, particularly NaSH, are preferred.

The reaction may be illustrated by the following equation:

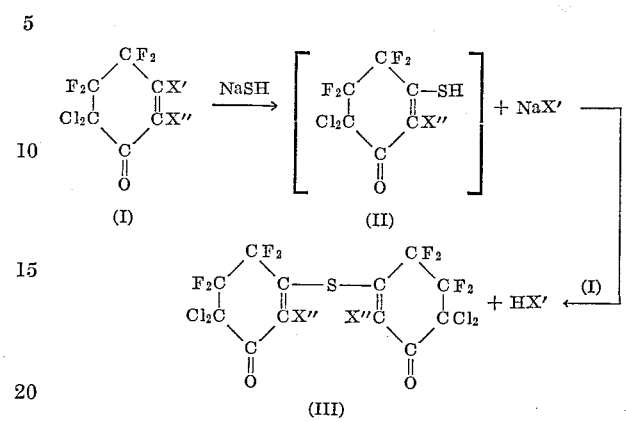

wherein X' and X" may be F or Cl. It will be noted that the initial reaction takes place at the site of the most reactive halogen atom, viz. X'. Initial reaction will take place at this site regardless of whether X' is a fluorine atom and X" is a chlorine atom, or vice-versa. After formation of the intermediate indicated by Formula II, reaction with another molecule of the starting material of Formula I takes place to form the final product of Formula III. The result is surprising because the reaction of the starting material of Formula I with an alkali metal hydrosulfide would have been expected to produce a final product corresponding to the intermediate shown by Formula II and it was unexpected that the intermediate of Formula II would dimerize with another molecule of starting material to form the corresponding "bis" compound as was obtained.

Although it is postulated that the reaction proceeds as outlined above, it is to be understood that the invention is not to be limited by any particular theory of operation.

Where the corresponding bis(perhalocyclopentenone) sulfides are desired, the corresponding perhalocyclopentenones are employed as starting materials and the reaction proceeds substantially in the same way.

The perhalocycloalkenone starting materials may be prepared by reacting the corresponding perhalocycloalkene with sulfur trioxide in the presence of a boron or pentavalent antimony compound catalyst at temperatures between about 50–100° C., as substantially disclosed and claimed in co-pending, commonly assigned application of Melvin M. Schlechter and Richard F. Sweeney, Serial No. 373,058, filed June 5, 1964.

The reaction of the invention may be carried out in conventional vessels constructed of ordinary materials, such as Pyrex or steel, which vessels are preferably equipped with stirring means, condensing means and means for adding the mercaptan slowly, such as a dropping funnel.

The process affords the advantages of operation at atmospheric pressures and at low temperatures. Superatmospheric or subatmospheric pressures may be employed, however, with no particular benefit.

The reaction is strongly exothermic and may be carried out over a relatively wide range of temperatures. Reaction temperatures should be maintained below the reflux temperature of the reaction mixture in order to avoid undesirable loss of material. Generally, temperatures between about room temperature and 100° C. are preferred, although temperatures above and below this range may be employed.

Reaction temperatures may be controlled where desired by regulating mixing of the reactants to control exotherm, by removing heat of reaction, by any conventional cooling means or by any combination of the above.

Stoichiometry of the reaction requires two moles of perhalocycloalkenone starting material per mole of alkali hydrosulfide. The reaction will proceed with mole ratios of reactants above or below the 2:1 ratio, however, with proportionately diminished yields based upon the reactant present in excess.

The products may be purified and recovered by ordinary laboratory procedures. For example, the alkali metal salt by-products may be filtered out and the desired sulfide product further purified and recovered by fractional distillation.

The products and process of the invention are further illustrated by the following examples in which parts and percentages are by weight unless otherwise indicated.

Example 1

A 500 ml. three-necked flask, equipped with a reflux condenser, dropping funnel and stirrer was charged with 160 g. (0.586 mole) of 2,3-dichlorohexafluoro-2-cyclohexenone (B.P. 135° C.). To the reaction flask and contents were gradually added 40 g. of NaSH·XH$_2$O, with stirring, over a period of about one hour. An exothermic reaction took place and the temperature in the reaction flask rose to about 90° C. At the end of the one hour period by-product sodium chloride was filtered out leaving about 130 g. of a red-colored oil. The red-colored oil was fractionally distilled and there were recovered 64 g. (0.23 mole) of 2,3-dichlorohexafluoro-2-cyclohexenone starting material and 49 g. (0.097 mole) of a red-colored oil boiling mainly at 152–155° C./23 mm., identified as bis(2-chlorohexafluoro-1-cyclohexen-3-one) sulfide.

*Analysis.*—Calculated for C$_{12}$Cl$_2$F$_{12}$O$_2$S: C, 28.40%; Cl, 14.00%; S, 6.31%. Found: C, 28.72%; Cl, 14.17%; S, 6.44%.

Infrared spectrographic analysis showed a carbonyl absorption band at 5.7 microns and a —SC=CCl— absorption band at 6.45 microns, thus substantiating the expected structure.

Example 2

A 500 ml. three-necked flask, equipped with a reflux condenser, dropping funnel and stirrer was charged with 107 g. (0.480 mole) of 2,3-dichlorotetrafluoro-2-cyclopentenone. To the reaction flask and contents were gradually added 15 g. of NaSH·XH$_2$O, with stirring. A vigorous exothermic reaction took place. Sodium chloride by-product was filtered out and the liquid reaction product was distilled to yield 42 g. (0.19 mole) of 2,3-dichlorotetrafluoro-2-cyclopentenone starting material and 26 g. (0.064 mole) of a red-colored oil boiling at 242–243° C. at atmospheric pressure, identified as bis-(2-chlorotetrafluoro-1-cyclopenten-3-one) sulfide.

*Analysis.*—Calculated for C$_{10}$Cl$_2$F$_8$O$_2$S: Cl, 17.44%; S, 7.86%. Found: Cl, 16.8%; S, 7.7%.

Infrared spectrographic analysis was consistent with the expected structure.

Examples 3–9

The process of Examples 1 and 2 is repeated with the starting materials listed in column 1 of Table I. The corresponding sulfide products obtained are listed oppositely in column 2. In Examples 3–5 NaSH (anhydrous) is used as the alkali metal hydrosulfide and in Examples 6–9 KSH·XH$_2$O is used as the alkali metal hydrosulfide. In all of the examples, approximately a 1:2 molar ratio of alkali metal hydrosulfide to perhalocycloalkenone starting material is employed.

TABLE I

| Example | Perhalocycloalkenone Reactant | Sulfide Product |
| --- | --- | --- |
| 3 | 2,3,4,4-tetrachlorotetrafluoro-2-cyclohexenone. | Bis(2,6,6-trichlorotetrafluoro-1-cyclohexen-3-one) sulfide. |
| 4 | 2,3,4,4,6,6-hexachlorodifluoro-2-cyclohexenone. | Bis(2,4,4,6,6-pentachloro difluoro-1-cyclohexen-3-one) sulfide. |
| 5 | 2,3-dichlorotetrafluoro-2-cyclopentenone. | Bis(2-chlorotetrafluoro-1-cyclopenten-3-one) sulfide. |
| 6 | 4,4-dichlorotetrafluoro-2-cyclopentenone. | Bis(5,5-dichlorotrifluoro-1-cyclopenten-3-one) sulfide. |
| 7 | 3,4,4,5,5-pentachloromonofluoro-2-cyclopentenone. | Bis(4,5,5-tetrachloromonofluoro-1-cyclopenten-3-one) sulfide. |
| 8 | 2,5,5-trichlorotrifluoro-2-cyclopentenone. | Bis(2,4,4-trichlorodifluoro-1-cyclopenten-3-one) sulfide. |
| 9 | 2,3,4,5-tetrachlorodifluoro-2-cyclopentenone. | Bis(2,4,5-trichlorodifluoro-1-cyclopenten-3-one) sulfide. |

When other alkali metal hydrosulfides, such as CsSH and LiSH are reacted with perhalocycloalkenones according to the invention, the corresponding ketone sulfides are formed substantially as described.

Example 10

Bis(2-chlorohexafluoro-1-cyclohexen-3-one) sulfide was tested as a sealing adjuvant for strips of thermoplastic film composed of a copolymer of about 96% trifluorochloroethylene and about 4% vinylidene fluoride. A saturated solution of this polymer in the sulfide was prepared by refluxing the sulfide with said polymer, cooling the mixture to room temperature and decanting the solution from the undissolved polymer. A pair of polymer film strips was sealed together without the use of sealing adjuvant. Another pair of polymer film strips was sealed together, this time employing as sealing adjuvant the above-described polymer solution in the sulfide. The sulfide polymer solution was applied by merely coating, as by brushing, the inner surfaces of the film strips to be sealed. An impulse heat sealer was used. The impulse heat sealer was a Sentinel impulse sealer manufactured by Packaging Industries, Inc., of Montclair, New Jersey. Sealing pressure was 30 p.s.i. The heat sealing temperature was 400° F. The dwell time for the seal, or in other words, the length of time during which the pressure and heat were applied to effect the seal, was three (3) seconds. The seal strength was tested by measuring the amount of force needed to rupture or pull apart the seal. As can be seen from the following table, the polymer film strip pair sealed with the adjuvant solution, ruptured at a weight considerably higher than the polymer film strip pair which was sealed without the use of sealing adjuvant.

TABLE II

| | Wt. to effect rupture of the seal, g. |
| --- | --- |
| Film strips heat-sealed without the use of adjuvant | <346 |
| Film strips heat-sealed with a polymer solution in bis(1-chlorohexafluoro-1-cyclohexen-3-one) sulfide | >1,370 |

Example 11

Bis(2,6,6-trichlorotetrafluoro - 1 - cyclohexen-3-one) sulfide, bis(2-chlorotetrafluoro-1-cyclopenten-3-one) sulfide and bis(5,5-dichlorotrifluoro-1-cyclopenten-3-one) sulfide are tested as sealing adjuvants for strips of thermoplastic film composed of a copolymer of about 96% trifluorochloroethylene and about 4% vinylidene fluoride. Saturated solutions of these polymers in the respective sulfides are prepared by separately refluxing the sulfides with said polymers, cooling the mixtures to room temperature and decanting the solutions from the undissolved polymers. A pair of polymer film strips are sealed together without the use of sealing adjuvant. Three more pairs of polymer film strips are sealed together, this time employing as sealing adjuvants each of the above-described polymer solutions in the respective sulfides. The sealing adjuvants are applied by merely coating, as by brushing, the inner surfaces of the film strips to be sealed. An impulse heat sealer is used. The impulse heat sealer is a Sentinel impulse sealer manufactured by Packaging Industries, Inc. of Montclair, New Jersey. Sealing pressure is 30 p.s.i. The heat sealing temperature is 400° F. The dwell time for the seal, or in other words, the length of time during which the pressure and heat are applied to effect the seal, is three (3) seconds. The seal strength is tested by measuring the amount of force needed to rupture or pull apart the seal. As can be seen from the following table, the polymer film strip pairs sealed with the adjuvant solutions, rupture at weights considerably higher than the polymer film strip pair which is sealed without the use of sealing adjuvant.

TABLE III

| | Wt. to effect rupture, g. |
|---|---|
| Film strips heat-sealed without the use of adjuvant | <346 |
| Film strips heat-sealed with a polymer solution in: | |
| Bis(2,6,6-trichlorotetrafluoro-1-cyclohexen-3-one) sulfide | >800 |
| Bis(2-chlorotetrafluoro-1-cyclopenten-3-one) sulfide | >800 |
| Bis(5,5-dichlorotrifluoro-1-cyclopenten-3-one) sulfide | >800 |

Although a copolymer of about 96% trifluorochloroethylene and about 4% vinylidene fluoride is employed in the above examples, a wide variety of polymers, terpolymers and copolymers of trifluorochloroethylene may be employed with equivalent results; homopolymeric trifluorochloroethylene and copolymers of trifluorochloroethylene with vinyl chloride, 1,1-chlorofluoroethylene, trifluoroethylene and perfluorobutadiene being exemplary. In general, most suitable are those compositions containing upwards of 50% by weight of trifluorochloroethylene. The general class of compositions described above can be referred to generically as polytrifluorochloroethylene.

When other sulfide products within the scope of the invention, such as those additional ones listed in the second column of Table I, are used as sealing adjuvants for films of polytrifluorochloroethylene, substantially the same results are obtained; that is to say, films of polytrifluorochloroethylene which are heat sealed employing such adjuvants rupture at weights considerably higher than films of polytrifluorochloroethylene which are heat sealed without using sealing adjuvants.

Since various changes and modifications may be made without departing from the spirit of the invention, the invention is to be limited only by the scope of the appended claims.

We claim:
1. Compounds of the formula:

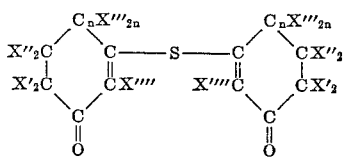

wherein X′–X′′′′ may be F or Cl and $n$ may be 0 or 1, there being at least two fluorine atoms and two chlorine atoms present in the molecule.

2. Compounds according to claim 1 in which $n$ is 0.

3. Compounds according to claim 1 in which $n$ is 1.

4. Compounds of the formula:

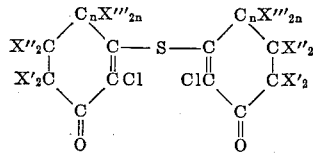

wherein X may be F or Cl and $n$ may be 0 or 1, there being at least two fluorine atoms present in the molecule.

5. Compounds according to claim 4 in which $n$ is 0.
6. Compounds according to claim 4 in which $n$ is 1.
7. Bis(2 - chlorohexafluoro - 1 - cyclohexen - 3 - one) sulfide.
8. Bis(2 - chlorotetrafluoro - 1 - cyclopenten - 3 - one) sulfide.
9. Bis(2,4,4,6,6 - pentachlorodifluoro - 1 - cyclohexen-3-one) sulfide.
10. Bis(5,5 - dichlorotrifluoro - 1 - cyclopenten - 3-one)sulfide.
11. The process for preparing a compound of the formula:

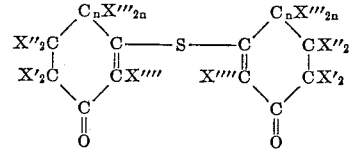

wherein X′–X′′′′ may be F or Cl and $n$ may be 0 or 1, there being at least two fluorine atoms and two chlorine atoms present in the molecule, which comprises reacting a compound of the formula:

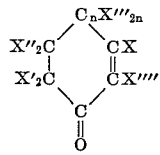

wherein X–X′′′′ may be F or Cl and may be the same or different provided that there is present at least one fluorine atom and one chlorine atom within X′–X′′′′ and $n$ may be 0 or 1, with an alkali metal hydrosulfide or a hydrate thereof, at temperatures below the reflux temperature of the reaction mixture.

12. The process of claim 11 in which $n$ is 0.
13. The process of claim 11 in which $n$ is 1.
14. The process for preparing compounds of the formula:

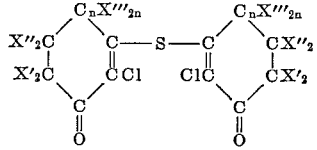

wherein X may be F or Cl and $n$ may be 0 or 1, there being at least two fluorine atoms present in the molecule, which comprises reacting a corresponding compound of the formula:

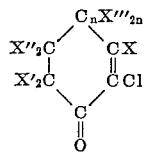

wherein X–X′′′ may be F or Cl and $n$ may be 0 or 1, there being at least one fluorine atom present in the molecule, with an alkali metal hydrosulfide or a hydrate thereof at temperatures below the reflux temperature of the reaction mixture.

15. The process of claim 14 in which $n$ is 0.

16. The process of claim 14 in which $n$ is 1.

17. The process for preparing bis(2-chlorohexafluoro-1-cyclohexen-3-one) sulfide which comprises reacting 2,3-dichlorohexafluoro-2-cyclohexenone with an alkali metal hydrosulfide or a hydrate thereof, at temperatures below the reflux temperature of the reaction mixture.

18. The process of claim 17 in which the alkali metal hydrosulfide is $NaSH \cdot XH_2O$.

19. The process for preparing bis(2-chlorotetrafluoro-1-cyclopenten-3-one) sulfide which comprises reacting 2,3-dichlorotetrafluoro-2-cyclopentenone with an alkali metal hydrosulfide or a hydrate thereof, at temperatures below the reflux temperature of the reaction mixture.

No references cited.

LEON ZITVER, *Primary Examiner.*

M. JACOB, *Assistant Examiner.*